A. T. CYR.
DROP WAGON BOX.
APPLICATION FILED JULY 8, 1908.

928,503.

Patented July 20, 1909.
5 SHEETS—SHEET 1.

Witnesses

Inventor
Anthony T. Cyr
By
Attorneys

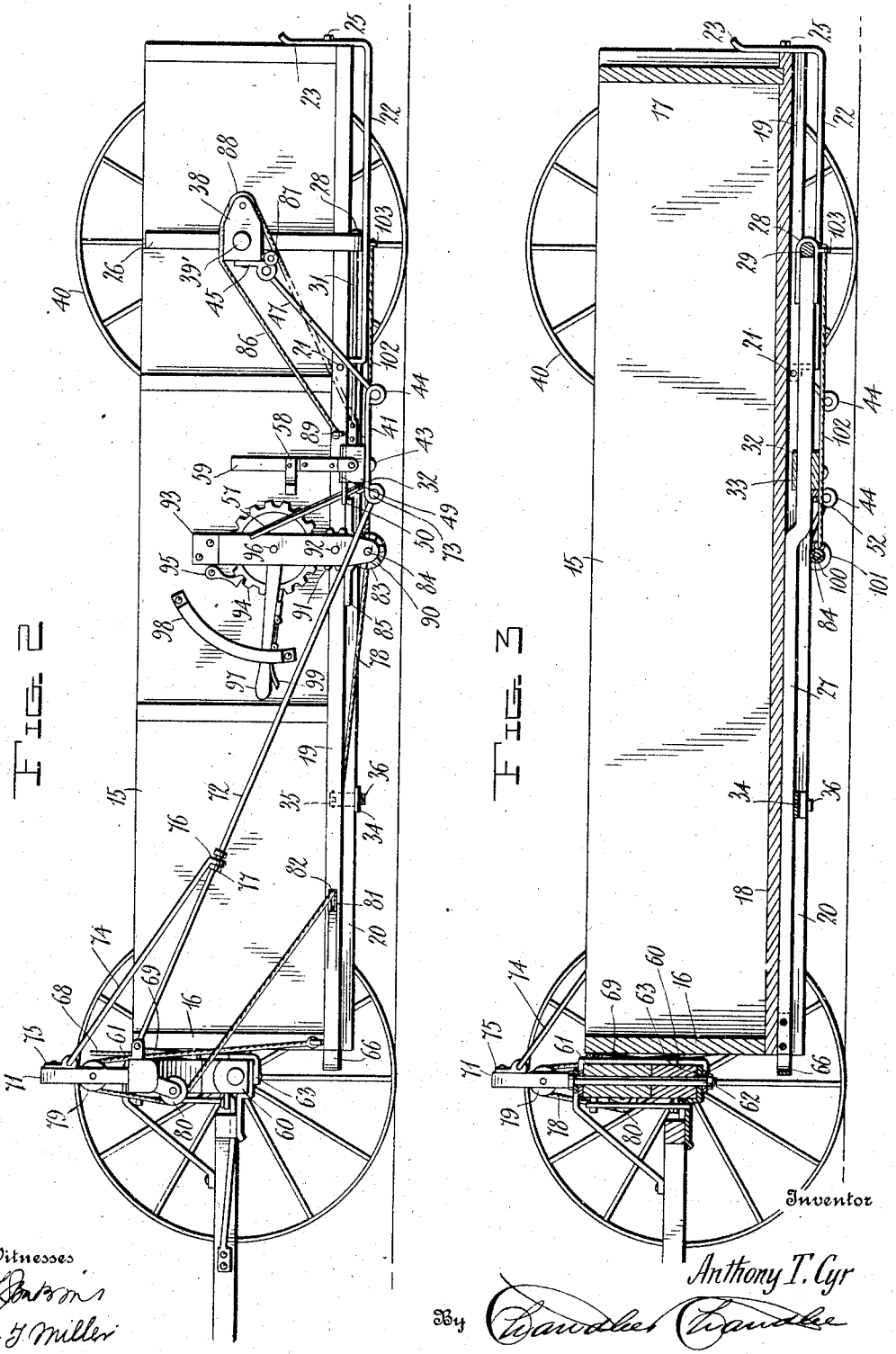

A. T. CYR.
DROP WAGON BOX.
APPLICATION FILED JULY 8, 1908.

928,503.

Patented July 20, 1909.
5 SHEETS—SHEET 3.

Witnesses
J. F. Jenkin
M. J. Miller

Inventor
Anthony T. Cyr
By Chandler & Chandler
Attorneys

A. T. CYR.
DROP WAGON BOX.
APPLICATION FILED JULY 8, 1908.
928,503.
Patented July 20, 1909.
5 SHEETS—SHEET 4.
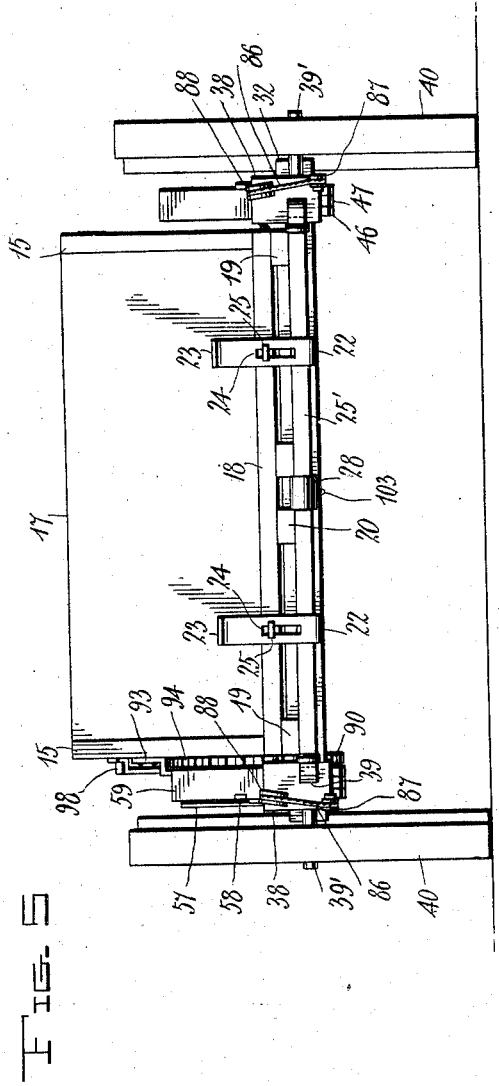
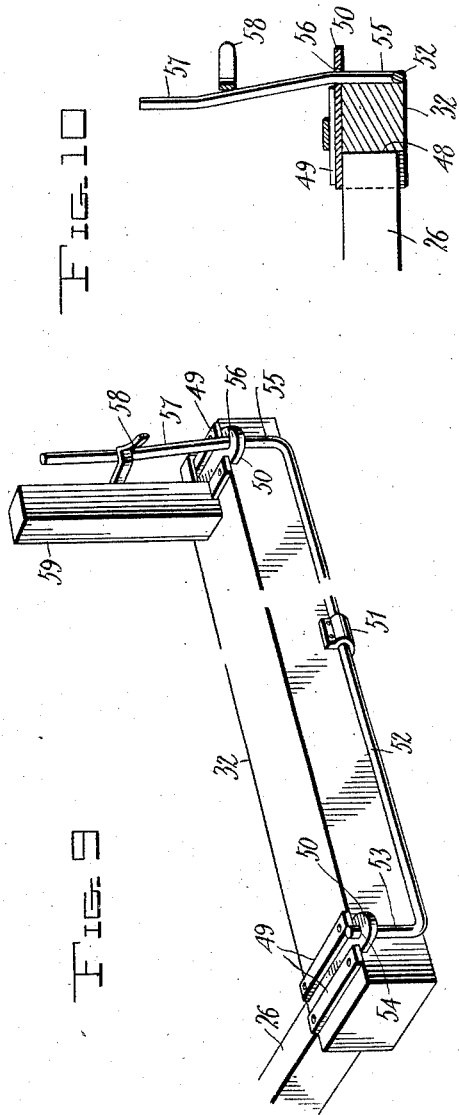
Witnesses
Inventor
Anthony T. Cyr.
By
Attorneys A. T. CYR.
DROP WAGON BOX.
APPLICATION FILED JULY 8, 1908.
928,503.
Patented July 20, 1909.
5 SHEETS—SHEET 5.
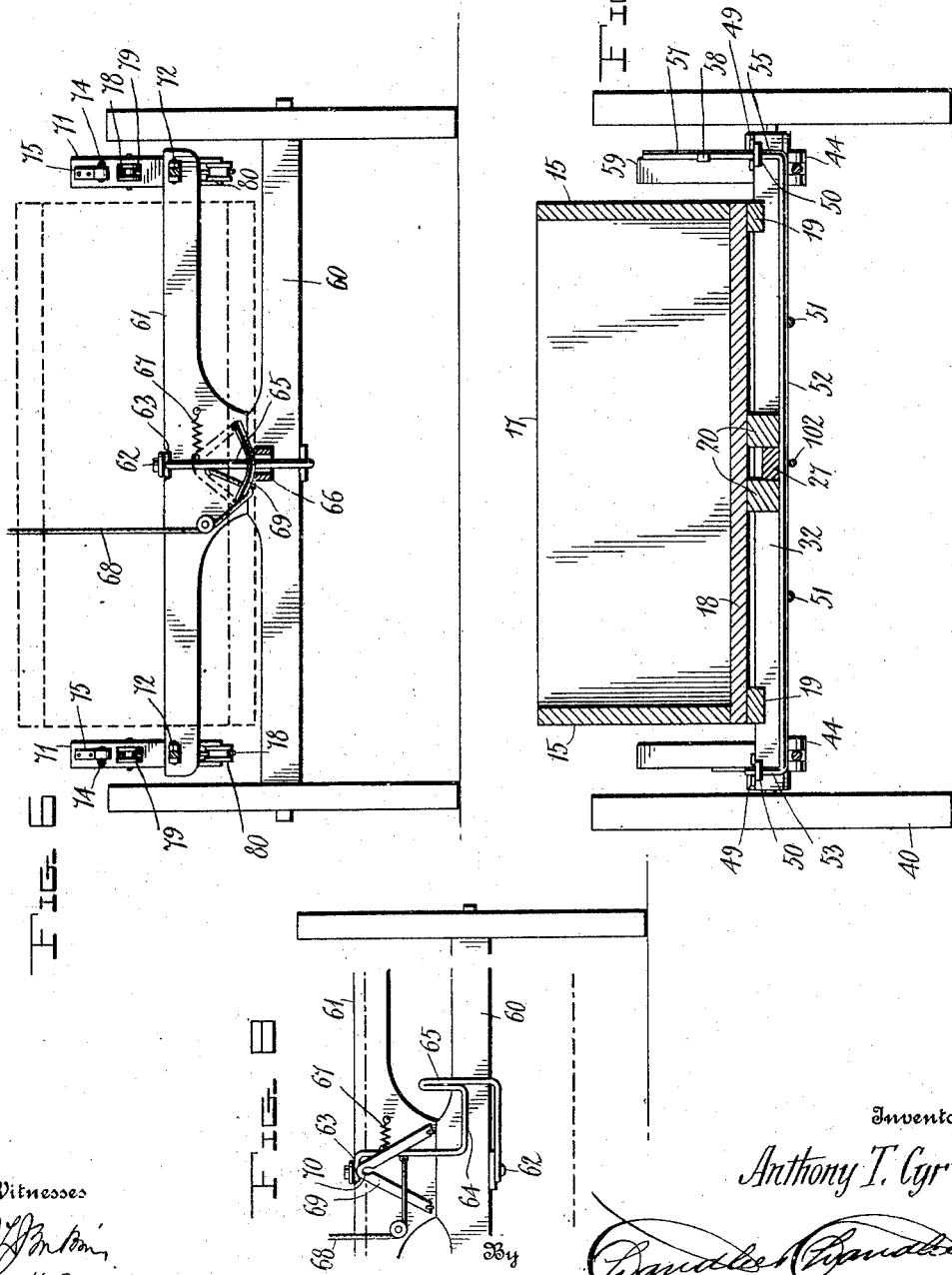
Witnesses
Inventor
Anthony T. Cyr
By
Attorneys

UNITED STATES PATENT OFFICE.

ANTHONY T. CYR, OF HUGO, MINNESOTA.

DROP WAGON-BOX.

No. 928,503.  Specification of Letters Patent.  Patented July 20, 1909.

Application filed July 8, 1908. Serial No. 442,524.

*To all whom it may concern:*

Be it known that I, ANTHONY T. CYR, a citizen of the United States, residing at Hugo, in the county of Washington and State of Minnesota, have invented certain new and useful Improvements in Drop Wagon-Boxes; and I do hereby declare the following to be a full, clear, and exact description of the invention, such as will enable others skilled in the art to which it appertains to make and use the same.

This invention relates to wagons and more particularly to a wagon having a box which may be dropped so that the wagon may be more readily loaded and unloaded than is at present the case.

It is the primary object of the present invention to provide a wagon so constructed that hoisting of a load into the wagon will be obviated and more specifically to provide a wagon the box of which may be bodily lowered almost to ground level so that it may be filled with ease and with a saving of time and labor and the novelty in the invention resides in the means which I have provided for lowering and raising the box.

The present invention is designed chiefly as an improvement over the form of wagons shown in my application for patent filed April 11, 1907, Serial No. 367,666 and the present form of wagon discloses advantages over the form shown in the application above mentioned which accrue from a novel means which I have employed for supporting the forward end of the wagon box and for holding the rear bolster in position to support the rear end of the said box.

Figure 1:
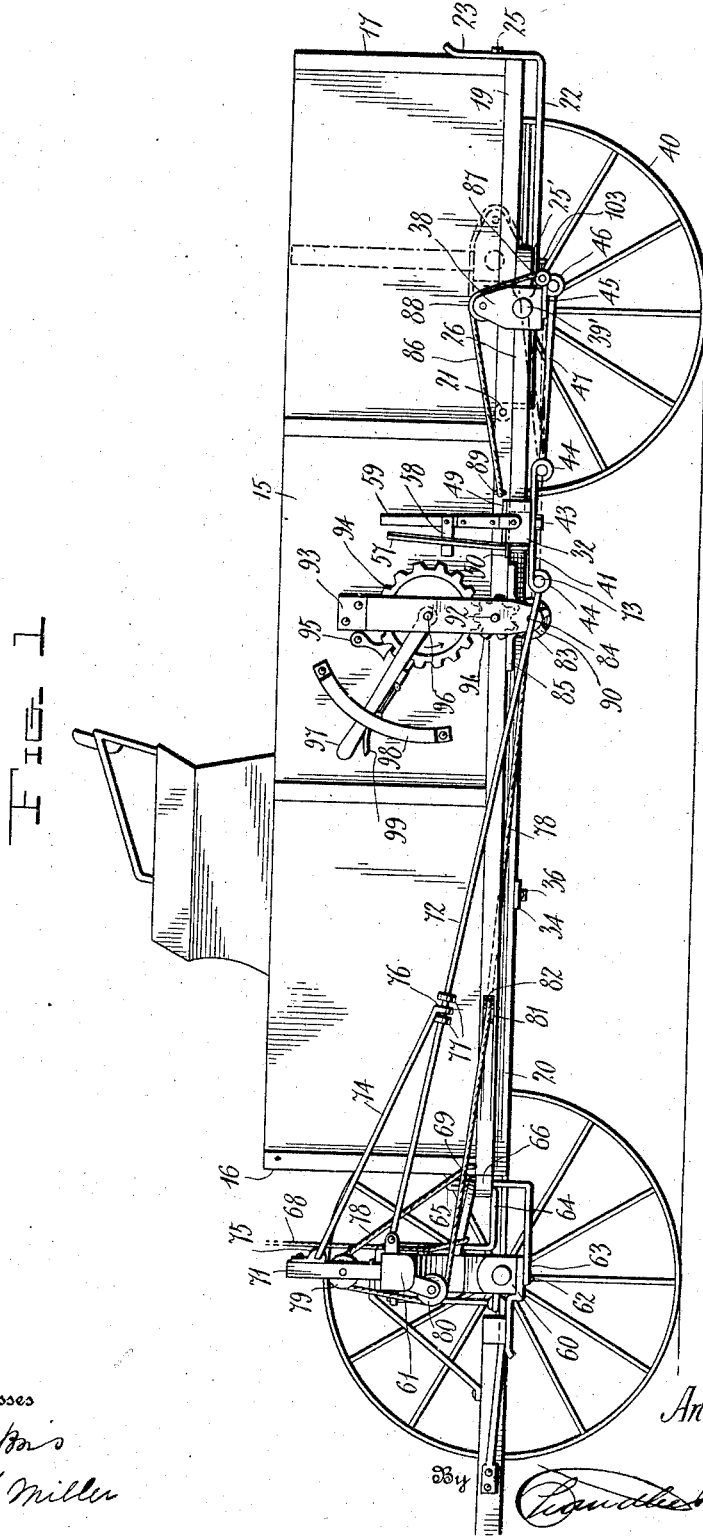
Figure 4:
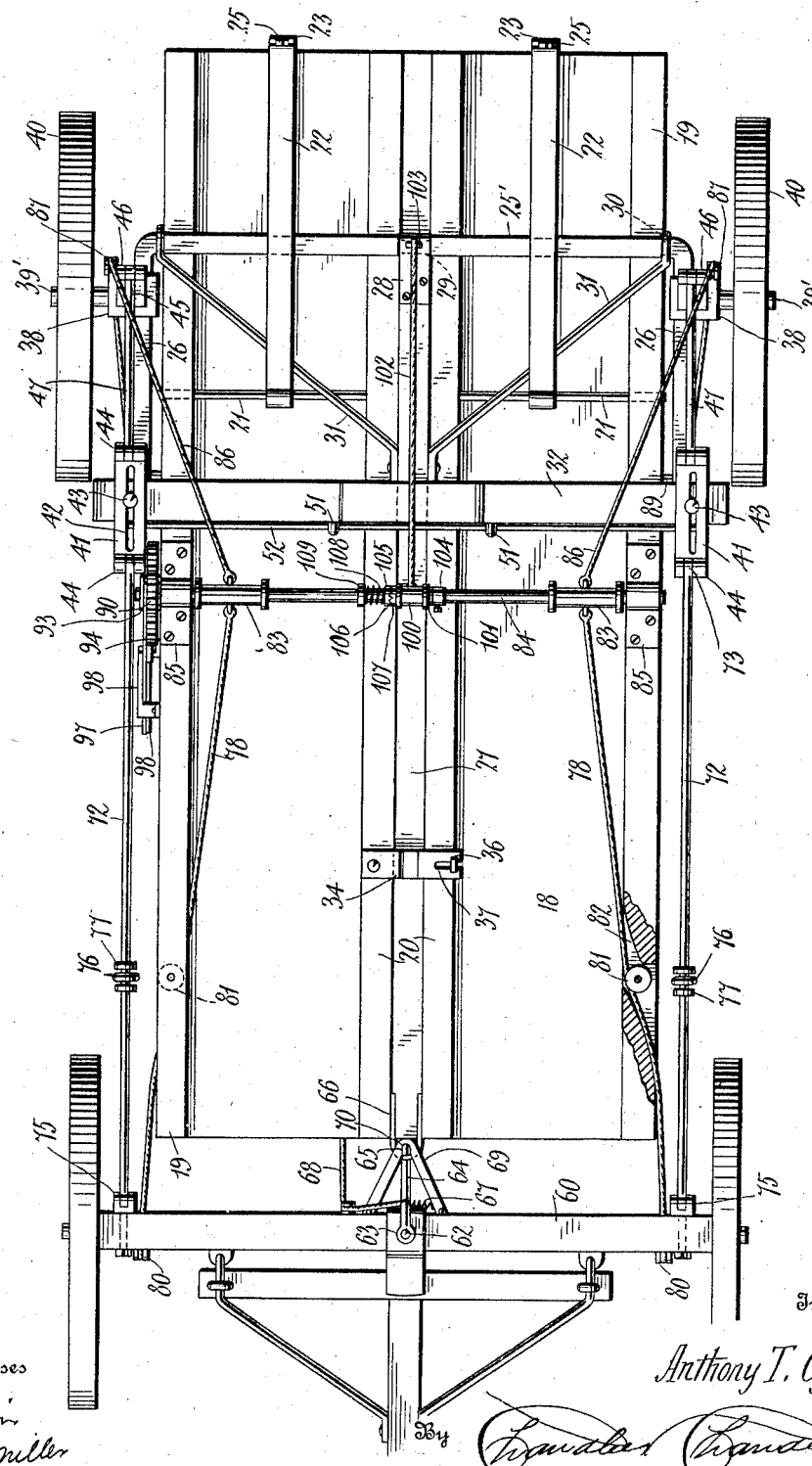

In the accompanying drawings, Figure 1 is a side elevation of the wagon embodying my invention showing the wagon box raised, Fig. 2 is a similar view but showing the wagon box lowered, Fig. 3 is a vertical longitudinal sectional view through the wagon, Fig. 4 is a bottom plan view thereof, Fig. 5 is a rear elevation, Fig. 6 is a vertical transverse sectional view taken directly rearwardly of the front bolster, Fig. 7 is a transverse sectional view showing the means for normally holding the rear bolster in position to support the wagon box in raised position, Fig. 8 is a detail view in elevation of a portion of the front bolster and similar to Fig. 6 but showing the supporting member upon the said bolster swung to inoperative position, Fig. 9 is a detail perspective view of the construction shown in Fig. 7.

Fig. 10 is a detail section through the construction shown in Fig. 9.

As clearly shown in the drawings, the wagon box is comprised of sides 15, a front end 16 and a rear end 17 the bottom of the box being indicated by the numeral 18. Secured upon the bottom 18 of the wagon box at each longitudinal edge thereof and extending throughout the length of each edge is a cleat 19 and similar cleats 20 are secured upon the under side of the said bottom midway between the cleats 19 and in parallel relation with respect to each other they being but slightly spaced apart. A rod 21 is passed through the cleats 19 and 20 at a point adjacent the rear end of the wagon box and pivoted to this rod and located one between each cleat 19 and the adjacent cleat 20 is a support 22. The two supports 22 normally extend beneath the bottom of the wagon box in parallel relation with respect thereto and with respect to each other and they have their rear ends bent to extend upwardly beside the rear end of the box as indicated by the numeral 23, the said portions of the support being formed each with a slot 24 through which is engaged a turn button 25 carried by the rear end 17 of the box the turn buttons being adapted to be turned to permit downward swinging movement of the support under conditions which will be presently fully explained.

The rear bolster of the wagon as illustrated in the drawings, is of U formation its connecting portion being indicated by the numeral 25′ and its arm or side portions by the numeral 26 the connecting portion extending transversely beneath the bottom 18 of the wagon box and between the under edges or sides of the cleats 19 and 20 and the support 22 it being understood of course that the bolster is free to slide, to a limited degree as will be presently explained, between the said cleats and the said support. The reach of the wagon is indicated by the numeral 27 and extends between the two cleats 20 it being snugly received therebetween but being free to slide with the rear bolster it being provided at its rear end with a clip 28 which is connected with a reduced rounded portion 29 formed at a point midway of the ends of the connecting portion 25 of the said bolster. The bolster is formed adjacent the ends of its connecting portion 25 with other reduced portions 30 and connected or engaged with these portions are the rear ends of brace rods 31 the other ends of the rods being secured in any suitable manner to the sides of the reach 27 at a point in advance of the bolster. A cross beam or sill 32 is secured to the under sides of the cleats 19 and 20 and extends transversely of the wagon box in advance of the rear bolster above described and projects at its ends beyond the sides of the said box and this cleat serves as a support for portions of the raising and lowering mechanism for the wagon box as will be explained in another paragraph, the said cross beam being recessed in its upper side as at 33 to receive the slidable reach 27 it serving as an additional support for the said reach. Swiveled to one of the cleats 20 adjacent the forward end thereof is a plate 34 which normally extends transversely of the said cleat and supports the forward end portions of the reach 27 it being supported itself by means of a pivoted latch 35 formed with a shouldered head 36 which engages in a notch 37 formed in the free end of the plate 34 it being understood that the latch is disengageable from the said plate.

The mountings for the rear wheels of the wagon are carried upon the arm of the rear bolster and each of the mountings is in the form of a block 38 which is formed with an opening 39 which extends therethrough and through which the corresponding arm of the bolster passes the block being slidable upon the said arm. Each block is formed with an integral spindle or stub shaft 39′ and disposed upon each of the spindles is a wheel 40. The blocks 38 are designed to have a certain definite movement upon the respective arms of the bolster owing to certain connections which will now be described and under conditions which will be explained in the explanation of the operation of the wagon and its raising and lowering mechanism. Disposed against the under side of the cross beam 32 of the wagon, at each end thereof, is a plate 41 which is formed with a slot 42 through which is passed a headed bolt 43 said bolt serving to support the plate beneath the cross beam and also to permit of sliding movement of the plate in a direction from front to rear or in other words longitudinally of the wagon box. Each of the plates is formed at each end with pintle lugs 44 and secured or formed upon each of the blocks 38 is a leaf 45 which is also formed with a pair of pintle lugs 46, there being a link rod 47 connecting each of the blocks 38 and the corresponding one of the plates 41 by pivoting or hinging its ends between the pintle lugs upon the block and the respective plates.

It is to be understood of course that under normal conditions, the rear bolster of the wagon is to be held in such position as to support the wagon box in raised position held I have provided a means which now will be specifically described. The cross beam 32 is formed in its upper side and rear edge and adjacent each end with a recess or seat 48 in which the extremities of the arms of the rear bolster are received when the bolster is swung downwardly to horizontal position, the block 38 being positioned against the inner ends of the arm when the bolster is in this position as is clearly shown in Fig. 1 of the drawings. Secured upon the upper face of the cross beam 32 adjacent each end thereof is a pair of plates 49 one of the said plates being located to each side of the recess or socket formed in the said beam and slidably received beneath each pair of plates is a detent in the form of a plate 50 the said detents being slidable to position to over lie the extremities of the arms 26 of the rear bolster when the said arms are swung to extend horizontally and to seat at their ends in the sockets or seats 48 formed in the said beam 32, it being understood that the arms are in this manner held against swinging up to vertical position.

Journaled for rocking movement in suitable bearings 51 secured upon the forward side of the cross beams 32 is a rock shaft 52 one end of which is turned upwardly at right-angles as at 53 and projects through an opening 54 formed in the corresponding plates 50 said openings being formed adjacent the forward end of said plate and the said end of the plate being extended forwardly beyond the forward edge of the beam 32 as is clearly shown in Fig. 9 of the drawings. The other end of the rock shaft 52 is turned vertically as at 55 and extends through an opening 56 formed in the other plate 50 adjacent the forward end thereof and this end 55 of the rock shaft is extended vertically to such a degree as to form or constitute a lever which is more specifically indicated by the numeral 57 it being understood of course that when the lever 57 extends directly vertically or substantially so, the plates 50 overlie the ends of the arms of the rear bolster and prevent swinging of the bolster to vertical position and further that upon rocking or swinging the lever 57 in a forward direction, the plates 50 will be slid forwardly in their guides and the ends of the arms 26 of the rear bolster will be released, the lever being held normally against such forward swinging movement by means of a leaf spring latch 58 which is secured to one side of an upright 59 which is fixed upon the cross beam 32.

I will now specifically describe the devices for supporting the forward ends of the wagon box and will afterward describe the mechanism provided for raising and lowering the box and finally the operation of the The front axle of the wagon is indicated by the numeral 60 and the front bolster by the numeral 61, there being the usual king-bolt 62 passed vertically through the axle and bolster and connecting the axle for turning movement with respect to the bolster. The said king-bolt 62 also serves as an attaching means for a supporting member which is formed preferably of a length of rod provided at each end with an eye 63 through which the king-bolt is passed, the rod being bent to extend vertically behind the bolster and axle from the upper eye to a point adjacent the lower edge of the axle being then bent at right angles as indicated by the numeral 64 and thence to form an upstanding hook or finger 65 the lower end portion of the rod being bent to extend beneath the portion 64 and terminating in the lower eye 63, the device being in effect a swinging hook which projects rearwardly from the axle and bolster. Secured upon the forward ends of the reach 27 is a clip 66 with which the upstanding hook or finger 65 of the supporting member is engaged when the wagon box is in normal or raised position and connected to the said supporting member and to the rear face of the bolster 61 is a spring 67 the function of which is to swing the supporting member to lie against the bolster and axle when the wagon box is being lowered or is in lowered position, a pull rope 68 being connected also with the said supporting member so as to provide means whereby it may be manually swung to extend directly rearwardly from the bolster and axle and in position for engagement with clip at the forward ends of the reach it being understood that a pull exerted upon the pull-rope will be against the tension of the spring 67. As a means for holding the supporting member in position for engagement with the clip at the forward end of the reach, I have provided a pivoted latch member which is comprised of diverging arms 69 the member being pivoted at the extremities of its arms to the rear side of the bolster 61 of the wagon and having its arms extending one to each side of the supporting member the said pivoted latch member being formed at the junction of its arms with an opening 70 for the reception of the upper end of the finger 65. The pull rope 68 is passed rearwardly of one arm 69 of the latch member so that the initial pull upon the rope will result in the latch member being swung vertically further pull serving to swing the supporting member upon the king-bolt as a pivot and to bring it to position against the rear sides of the bolster and axle, releasing of the rope acting to permit the latch member 69 to drop into engagement with the finger 65 of the supporting member and hold it in operative position.

The bolster 61 of the wagon is provided with the usual upstanding standards 71 one of which is located adjacent each end of the bolster and pivoted at its forward end to the bolster adjacent each end thereof and extending along each side of the wagon box is a rod 72 the other end of the rod being pivoted as at 73 between the pintle lugs formed at the forward end of the corresponding plate 41 there being a rod 74 pivoted at its forward end as at 75 to each of the standards 71 adjacent the upper end thereof, the rear ends of the last mentioned rod being formed each with an eye 75 through which passes the corresponding rod 72. Secured in any suitable manner upon each of the rods 72 is a pair of collars 77 which are slightly spaced and which receive between them the eye 76 at the rear end of the corresponding rod 74, it being understood of course that while the rods 74 have a slight play between the collars 77, they serve to hold by reason of their connections with the rod 72, the standards 71 and the bolster in upright or normal position while the wagon box is being lowered and the rods 72 are being swung upon their pivots.

To the forward corners of the wagon box are connected cables 78 and each of these cables is passed over a pulley 79 journaled in the respective standards 71 and beneath a pulley 80 journaled beneath the corresponding end of the bolster 61 and the cables are then passed rearwardly each around a pulley 81 journaled in a slot 82 formed in the respective cleats 19 at the side or longitudinal edge of the bottom or floor of the wagon box the cables being secured at their other ends each to one of a pair of drums 83 which are fixed upon a shaft 84 journaled in suitable bearings 85 fixed upon the under side of the cleat 19 directly in advance of the cross beams 32. Cables 86 are also secured one to each of the drums upon the said shaft and these latter cables are passed beneath the said cross beam 32, each beneath a pulley 87 journaled upon the corresponding block 38, over a pulley journaled at an angle in the corresponding block, the said pulley being indicated by the numeral 88, and finally secured at their other end one to each side of the wagon box as indicated by the numeral 89.

Fixed upon one end of the shaft 84 is a pinion 90 with which meshes a similar pinion 91 fixed upon a short shaft 92 which is journaled in bearings one upon one side of a wagon box and the other in a bearing plate 93 secured upon the said side of the wagon box. Meshing with the last mentioned pinion 91, is a gear 94 which is of considerably greater diameter than either of the pinions 90 and 91 and pivoted upon the said side of the wagon box is a gravity pawl 95 which normally rests in engagement with the teeth of the gear 94 so as to hold the gear against rotation in one direction but so as to permit of its rotation in the other direction. The gear 94 is fixed upon a shaft 96 and loosely connected with this shaft at one end is a lever 97 which works in a suitable arcuate guide 98 secured upon the said side wall of the wagon box and which is provided with a pawl and ratchet mechanism 99 the pawl being designed for engagement with the teeth of the gear and the lever being designed to be oscillated so as to impart a rotary movement to the gear and through the gear to the pinions 90 and 91 and the shaft upon which the pinion 90 is fixed it being understood that the shaft is in this manner rotated so as to wind the cable upon the drum which it carries.

The winding drum upon the shaft just described extends between the cleats 19 and the respective cleats 20 and loosely mounted upon that portion of the shaft which extends between the cleats 20 is a sleeve 100 which is formed with a pair of collars 101 and to which is secured, at a point between the collars, the forward end of a cable 102 which at its rear end is connected as at 103 to the clip at the rear end of the reach 27 it being understood that the sleeve 100 together with its collars 101 forms in effect a windlass or drum upon which the cable is to be wound, the sleeve being held against movement in one direction longitudinally upon the shaft by means of a collar 104 Splined upon the said shaft is a sleeve 105 which at one end is formed with clutch teeth 106 which engage with similar teeth 107 formed at the opposed end of the sleeve 100, there being a spring 108 engaged upon the shaft and bearing at one end against the sleeve 105 and at its other end against a collar 109 upon the said shaft the spring acting to normally hold the sleeve 105 with its teeth in engagement with the teeth upon the sleeve 100. The function of this clutch mechanism will presently be described in connection with the description of the operation of the raising and lowering mechanism of the wagon.

The method of operating the raising and lowering mechanism is as follows: it being supposed that the wagon box is in raised position. The lever 57 is rocked forwardly thereby withdrawing the plate 50 from engagement over the extremities of the arms 26 of the bolster of the wagon and releasing the said bolster for upward swinging movement, the shaft 84 being then rotated through the medium of the lever 97 and the gear 90, 91 and 94 in a direction to wind up the cables 78 this rotation being continued until the box has been raised sufficiently high to disengage the clip at the forward end of the reach from the upstanding finger 65 of the supporting member upon the front bolster and axle. The shaft is then rotated in a reverse direction and the cables 78 and 86 are gradually unwound so as to permit lowering of the wagon box to the position shown in Figs. 2 and 3 of the drawings, it being understood that the rear bolster will swing to vertical position as illustrated in Fig. 2 and that the block 38 thereon will slide in the direction of the extremities of the arms upon which they are engaged. As soon as the clip at the forward end of the reach is disengaged from the upstanding finger of the supporting member, this member is pulled by its controlling spring to rest flat against the faces of the front bolster and axle of the wagon and at the same time, the reach is slid rearwardly to such a degree as to bring its forward end to a point rearwardly of the vertical plane occupied by the front end of the wagon box so that this end of the reach will not interfere with the front bolster and axle. It will be observed from the drawings and the foregoing description of the invention that the weight of the wagon box normally tends to swing the rear bolster to vertical position and that consequently it is only necessary to slacken all of the cables in order to lower the said box.

In order to raise the box after it has been filled with the material to be transported, the shaft 84 is rotated in the direction first described and the initial rotation of this shaft will result in a rotation of the winding sleeve 100 to such a degree as to slide the reach of the wagon forwardly so as to bring its forward end carrying the clip to position for engagement by the upstanding finger. Rotation of the shaft in the direction stated will serve to take up the slack of the cables or in other words to wind them on their respective winding drums and the wagon box will be raised the rear bolster swinging downwardly to horizontal or normal position as will be readily understood and seating at the ends of its arms in the sockets provided for it in the cross beams 32, the lever 57 being rocked rearwardly as soon as the arms have assumed this position so as to slide the detents over the said ends of the arms. After the wagon box has been raised to such a height that its bottom will be in a plane slightly above the upper end of the upstanding finger 65, the supporting member of which this finger forms a part is swung around by pulling upon the rope which connects to said finger so as to move it rearwardly from the front axle and bolster and the box is then allowed to lower until this finger engages with the clip at the forward end of the reach.

What is claimed is:

1. A wagon of the class described comprising a box, a bolster supporting one end of the box and constructed and arranged when in one position to receive the box, journals slidably mounted upon the bolster, and means for supporting the other end of the box in raised and in lowered position.

2. A wagon of the class described comprising a box, a U-shaped bolster supporting one end of the box upon its connecting portion, said bolster being constructed and arranged when in one position to receive the box, journals slidably mounted upon the arms of the bolster, and means for supporting the other end of the box in raised or lowered position.

3. A wagon of the class described comprising a box, a U-shaped bolster supporting the box upon its connecting portion, the bolster being arranged to extend horizontally to support the box in raised position and to swing to vertical position to permit dropping of the box, journals slidably mounted upon the arms of the bolster, and means for supporting the other end of the box in raised and in lowered position.

4. A wagon of the class described comprising a box, a U-shaped bolster supporting one end of the box upon its connecting portion, means for normally holding the bolster in horizontal position to support the box in raised position, said means being releasable to permit vertical swinging of the bolster and thereby permit dropping of the box, journals slidably mounted upon the arms of the bolster, and means for supporting the other end of the box in raised and in lowered position.

5. A wagon of the class described comprising a box, a U-shaped bolster supporting one end of the box upon its connecting portion, means for normally holding the bolster in horizontal position to support the box in raised position, said means being releasable to permit swinging of the bolster to vertical position, journals mounted upon the bolster and arranged to move in the direction of the extremities of the arms of the bolster when the same is swung to vertical position, and means for supporting the other end of the box in raised and in lowered position.

6. A wagon of the class described comprising a box, a U-shaped bolster supporting one end of the box upon its connecting portion, means for normally holding the bolster in horizontal position, said means being releasable to permit swinging of the bolster to vertical position, journals slidably mounted one upon each arm of the bolster and arranged to move in the direction of the extremities of the arm when the bolster has been swung to vertical position, and means coöperating with the bolster for supporting the other end of the box in raised and lowered position.

7. A wagon of the class described comprising a box, a U-shaped bolster supporting one end of the box upon its connecting portion, means for normally holding the bolster in horizontal position to support the box in raised position, the said means being releasable to permit of vertical swinging movement of the bolster with its arms extending to each side of the box, a journal slidably mounted upon each arm of the bolster, the said journals being arranged to slide in the direction of the extremities of the arm when the bolster is swung to extend vertically, a cable connected with each of the journals, means whereby the cables may be taken up so as to return the bolster to horizontal position, and means for supporting the other end of the box in raised or in lowered position.

8. A wagon of the class described comprising a box, a bolster supporting one end of the box, means for normally holding the bolster in horizontal position to support the box in raised position, said means being releasable to permit of vertical swinging movement of the bolster to permit dropping of the box, a bolster for supporting the other end of the box, a reach operatively connected with the first mentioned bolster, a supporting member carried by the second mentioned bolster, the corresponding end of the reach being formed for engagement by the supporting member under normal conditions the said reach being arranged to be withdrawn upon swinging of the first mentioned bolster so as to move its extremity out of position for engagement by the supporting member upon the second mentioned bolster.

9. A wagon of the class described comprising a box, a U-shaped bolster supporting one end of the box upon its connecting portion and having its arms extending one at each side of the box, means for normally holding the bolster in horizontal position and thereby supporting the box in raised position, said means being releasable to permit swinging of the bolster to vertical position, a bolster for supporting the other end of the box, a journal slidably mounted upon each arm of the first mentioned bolster, and connections between the last mentioned bolster and the journals upon the first mentioned bolster.

10. A wagon of the class described comprising a box, a U-shaped bolster supporting one end of the box upon its connecting portion, means for normally holding said bolster in horizontal position for supporting the box in raised position, said means being releasable to permit swinging of the bolster to vertical position, a bolster for supporting the other end of the box, a cross beam located at a point between the two bolsters, plates slidably mounted upon the cross beam, a journal slidable upon each arm of the first mentioned bolster and connections between each of the plates and the last mentioned bolster and each of the plates and the journals upon the first mentioned bolster.

11. A wagon of the class described comprising a box, a U-shaped bolster supporting one end of the box upon its connecting portion, a bolster for supporting the other end of the box, a cross beam located at a point between the two bolsters, detents arranged upon the cross beam and for engagement with the extremities of the arms of the first mentioned bolster to normally hold the same in horizontal position, means whereby the detents may be simultaneously disengaged from the extremities of the arms of the bolster to permit of swinging of the said bolster to vertical position, a journal slidably mounted upon each arm of the first mentioned bolster, the said bolster being mounted to have a limited movement in the direction of the second mentioned bolster, a reach connected with the first mentioned bolster and extending beneath the wagon body and projecting at its extremity normally beyond the other end thereof, a supporting member upon the second mentioned bolster, the said extremity of the reach being arranged for the engagement of the said supporting member normally therewith, connections between the cross beam and each of the journals whereby swinging of the bolster to vertical position will retract the said reach to bring its extremity inwardly of the aforementioned end of the wagon box, a windlass shaft, and cables connected to the wagon box at each side thereof and passed operatively over the bolster and connected to the windlass shaft.

12. A wagon of the class described comprising a box, a U-shaped bolster supporting one end of the box upon its connecting portion, a bolster for supporting the other end of the box, a cross beam located at a point between the two bolsters, detents arranged upon the cross beam and for engagement with the extremities of the arms of the first mentioned bolster to normally hold the same in horizontal position, means whereby the detents may be simultaneously disengaged from the extremities of the arms of the bolster to permit of swinging of the said bolster to vertical position, a journal slidably mounted upon each arm of the first mentioned bolster, the said bolster being mounted to have a limited movement in the direction of the second mentioned bolster, a reach connected with the first mentioned bolster and extending beneath the wagon body and projecting at its extremity normally beyond the other end thereof, a supporting member upon the second mentioned bolster, the said extremity of the reach being arranged for the engagement of the said supporting member normally therewith, connections between the cross beam and each of the journals whereby swinging of the bolster to vertical position will retract the said reach to bring its extremity inwardly of the aforementioned end of the wagon box, a windlass shaft, cables connected to the wagon box at each side thereof and passed operatively over the bolster and connected to the windlass shaft, and connection between the windlass shaft and the reach for returning the reach to position with its free extremity extending beyond the said end of the wagon box.

13. A wagon of the class described comprising a box, a bolster for supporting one end of the box in raised and in lowered position, a bolster for supporting the other end of the box, a supporting member mounted upon the last mentioned bolster, a member with which the supporting member is normally engaged to hold the wagon box in raised position, a spring connected with the said supporting member and acting to normally swing it to lie against the bolster, means connected with the said supporting member whereby it may be swung to position for engagement with the member upon the wagon box, and means carried by the bolster for automatically locking the supporting member in position for engagement with the member upon the wagon box.

In testimony whereof, I affix my signature, in presence of two witnesses.

ANTHONY T. CYR.

Witnesses:
THEODORE RIVET,
F. J. McPARTLIN.